United States Patent [19]
Jones et al.

[11] Patent Number: 6,082,740
[45] Date of Patent: Jul. 4, 2000

[54] BOLTED-RING SEAL CASING FOR HYDROGEN COOLED GENERATORS

[75] Inventors: Steven William Jones, Delanson; Luis Alberto Estrada, Clifton Park; Blake Weldon Wilson, Scotia, all of N.Y.

[73] Assignee: General Electric Co., Schenectady, N.Y.

[21] Appl. No.: 09/037,645

[22] Filed: Mar. 10, 1998

[51] Int. Cl.[7] ............................................. F16J 15/16
[52] U.S. Cl. ................................... 277/578; 277/581
[58] Field of Search ................................. 277/500, 578, 277/579, 580, 581; 29/888.3; 415/214.1

[56] References Cited

U.S. PATENT DOCUMENTS

| | | | |
|---|---|---|---|
| 3,559,539 | 2/1971 | Nagy | 277/500 X |
| 4,502,695 | 3/1985 | Choi | 277/500 X |
| 5,704,461 | 1/1998 | Vatsaas et al. | 277/500 X |

*Primary Examiner*—Anthony Knight
*Assistant Examiner*—Karlena D. Schwing
*Attorney, Agent, or Firm*—Nixon & Vanderhye

[57] ABSTRACT

A seal ring assembly for a generator includes an upper seal casing having a first radially inwardly directed channel for supporting at least one seal segment therein, the upper seal casing having a removable cap forming one side of the inwardly directed channel, and a lower seal casing having a second radially inwardly directed channel for supporting at least another seal segment. The first and second channels and the segments are adapted to be joined about a generator shaft to form a substantially 360° seal, and the upper and lower seal segments in the upper and lower seal casings, respectively, are secured together at an interface therebetween.

10 Claims, 4 Drawing Sheets

BOLTED-RING SEAL CASING FOR HYDROGEN COOLED GENERATORS

TECHNICAL FIELD

This invention relates generally to generators and more specifically, to shaft seal ring casings for hydrogen cooled generators.

BACKGROUND

In hydrogen cooled generators, casings for shaft seals are constructed of upper and lower halves, each half consisting of radially inner and outer sections. The casings of concern in this invention are those at both ends of the generator, but the insulated collector end is of primary importance for reasons explained further herein. The basic cross section of the casing halves is generally 'h' shaped, so that a cell or recess is formed at the radially inner diameter, opening toward the rotor, for housing radially inwardly projecting seal rings which, in turn, engage the rotor. Typically, each casing half, complete with a pair of 180° seal ring segments held in place by garter springs and hook fits, is assembled to the generator end shield prior to testing. Once in place, testing of the casing's insulation may be done before or after the seal ring segments in the upper and lower halves are bolted together, but always after the seal ring segments are located within the casing halves, and the latter fixed to generator end shield. Should the insulation fail the test, the casing halves and seal rings must be completely disassembled, corrections made, and the casing halves and seals reassembled to the generator for retesting. The cycle is repeated as necessary, but even one disassembly/reassembly is undesirable because each time the seal rings and other delicately machined parts are exposed to possible damage. In addition, because the insulation system is redundant, the paths to ground are doubled and trouble shooting becomes much more difficult.

Another problem lies in the bolting of the seal segments in the respective upper and lower casing halves. As apparent from the discussion above, bolting of the seal ring segments in the upper and lower casing halves to each other, can be accomplished only after the casing is completely assembled to the generator. This is accomplished through small openings on the upper half of the casing which provide access to the bolts, but the procedure is problematic, and of course, whenever it becomes necessary to service the seal rings, the seal ring bolts must be removed before the casing is disassembled from the generator.

In the case of medium size generator units, the seal ring casing includes an upper half (but without a complete seal ring cell), a cap to complete the upper half, and a complete lower half The cross section of the lower half and the cap is also an 'h' section so a cell is formed on the inner part of the lower casing to contain the ring segments. The upper and lower halves are assembled first to the generator, and then the insulation is tested. If the insulation fails, the nonredundant insulation system provided in these medium sized casings makes it simpler to find the problem and have it corrected. The seal ring segments per se are not assembled until the integrity of the insulation is assured. After testing the insulation successfully, the seal ring segments are installed by rolling the segments into the lower half and into the cap, where they are held in place by garter springs and hook fits on the ring segments. The casing assembly is completed by carefully sliding the cap with its seal rings into place and bolting it to the casing upper half By introducing a cap into the design, the size and weight of the part containing the segments is reduced and, by the same token, so is the possibility of damaging the rings in the assembly/disassembly process. Furthermore, the cap is the only part that needs to be disassembled for routine inspection/maintenance of the rings. Notwithstanding these advantages, however, space considerations and the cap's cross section do not allow for the access necessary for bolting the seal ring segments together in the upper and lower casing halves. As a result, it is not possible to take advantage of the higher performing bolted seal rings in the medium sized units.

SUMMARY OF THE INVENTION

This invention seeks to provide a simplified, seal casing construction for medium or large hydrogen cooled generators that utilizes bolted seal ring segments, and that readily permits assembly and testing of the seal casing's insulation system prior to placement of the seal ring segments within the casing. The seal casing consists of upper and lower halves, the upper half having a separable cap ring, while the lower half is of one-piece construction with an 'h' shaped cross section, creating a seal cell opening in a radially inwardly direction. The cap ring has a stylized 'z' section, with two parallel radial walls connected by an axial shoulder. The cap is adapted to cooperate with the upper casing to create an open cell similar to the open cell in the lower casing. In other words, in the upper half, the cell for the seal rings is formed by the combined removable cap and upper casing half, in the lower half, the cell is formed as in the prior art, by a one part half round casing. With the upper and lower casing halves bolted in place on the generator end shield, an annular seal cell is established for housing the seal ring segments. With this arrangement, the casing halves can be bolted to the generator end shield, and the insulated parts of the casing can be tested before insertion of the seal ring segments. Once the testing procedure is successfully completed, the upper and lower half seal rings are assembled around the shaft within the casing halves and bolted together. Since the shaft serves as a mandrel for the lower half segments, once upper and lower ring segments are bolted together, no external means other than spring action is required to keep the segments in place. The cap is then placed over the upper ring segments and bolted to the upper casing, thus completing the assembly. This casing design also makes liberal use of premachined surfaces for locating other casing components and for centering the casing to the generator so doweling is obviated. This cap design greatly simplifies the bolting together of upper and lower seal ring segments as this is done in the open (prior to assembling the cap to the upper casing) and further reduces exposure to damage of the rings by eliminating relative motion between segments and by allowing handling of the segments independently of other parts during assembly/disassembly. The manufacturing of the seal rings is also simplified because the need for hook fits is eliminated. Also, elimination of the hook fits extends seal ring performance since the annular seal ring assembly has more freedom to follow the shaft or rotor as it moves relative to the stationary parts.

Accordingly, in its broader aspects, the invention provides a seal ring assembly for a generator comprising an upper seal casing having a first radially inwardly directed channel, the upper seal casing having a removable cap forming one side of the inwardly directed channel; a lower seal casing having a second radially inwardly directed and upper and lower seal segments adapted to be support in the first radially inwardly directed channel and the second radially inwardly directed channel, respective, of the upper and lower seal casings, such that, in use, the upper and lower seal casing and the upper and lower segments are adapted to be joined about a generator shaft to form a 360° seal, with the upper and lower seal segments secured together at an interface therebetween.

Other objects and advantages of the present invention will become apparent from the detailed description which follows.

DETAILED DESCRIPTION OF THE DRAWINGS

Figure 1:
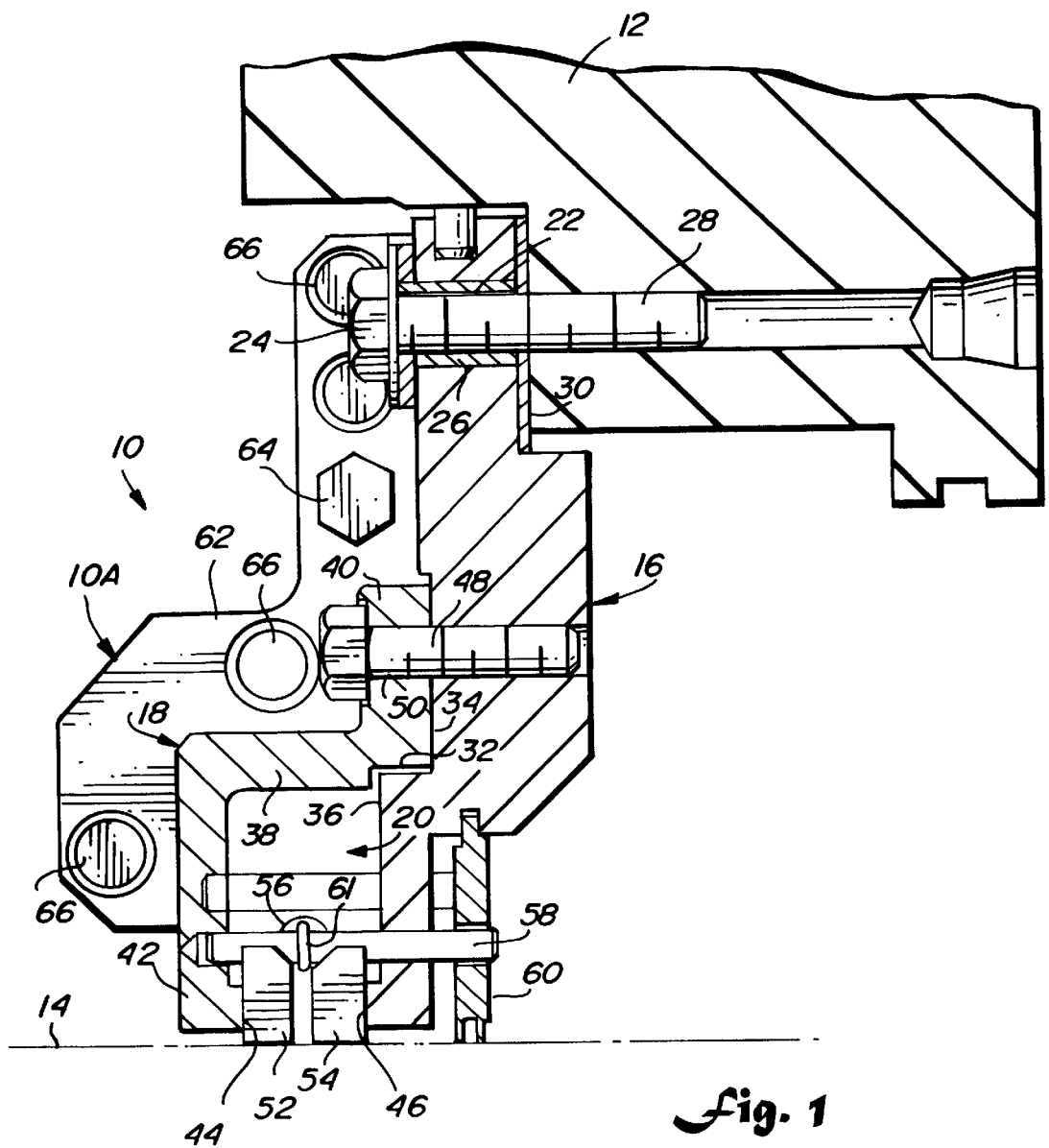
FIG. 1 is a simplified partial section view, illustrating an upper seal casing half in accordance with an exemplary embodiment of the invention.
Figure 2:
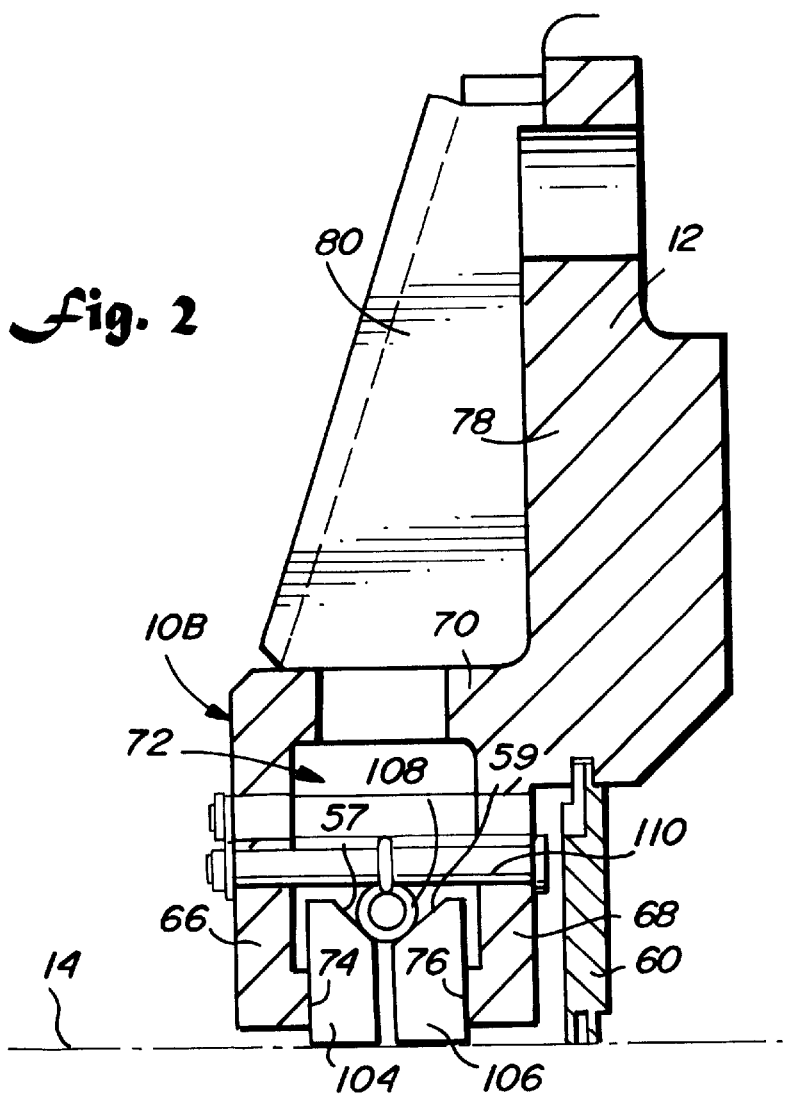
FIG. 2 is simplified part section illustrating a lower seal casing half in accordance with e invention.

Referring now to the drawings, an annular seal casing 10 is partially shown, which is adapted to be mounted to a generator end shield 12 in surrounding and sealing relationship with a rotor or shaft, indicated at 14. The casing 10 is formed in two parts, each extending 180° about the shaft. FIG. 1 shows a cross-section of an upper casing 10A, and FIG. 2 shows a cross-section of a lower casing 10B. Note that the view in FIG. 2 is not taken at the horizontal interface where the upper and lower casings are joined, so that the attachment bolt holes (as described in greater detail below) corresponding to those shown in FIG. 1 do not appear in FIG. 2. As also explained in greater detail below, the upper and lower semi-annular casings 10A, 10B are not only secured together at a flanged interface, but to the generator end shield 12 as well.

Figure 4:
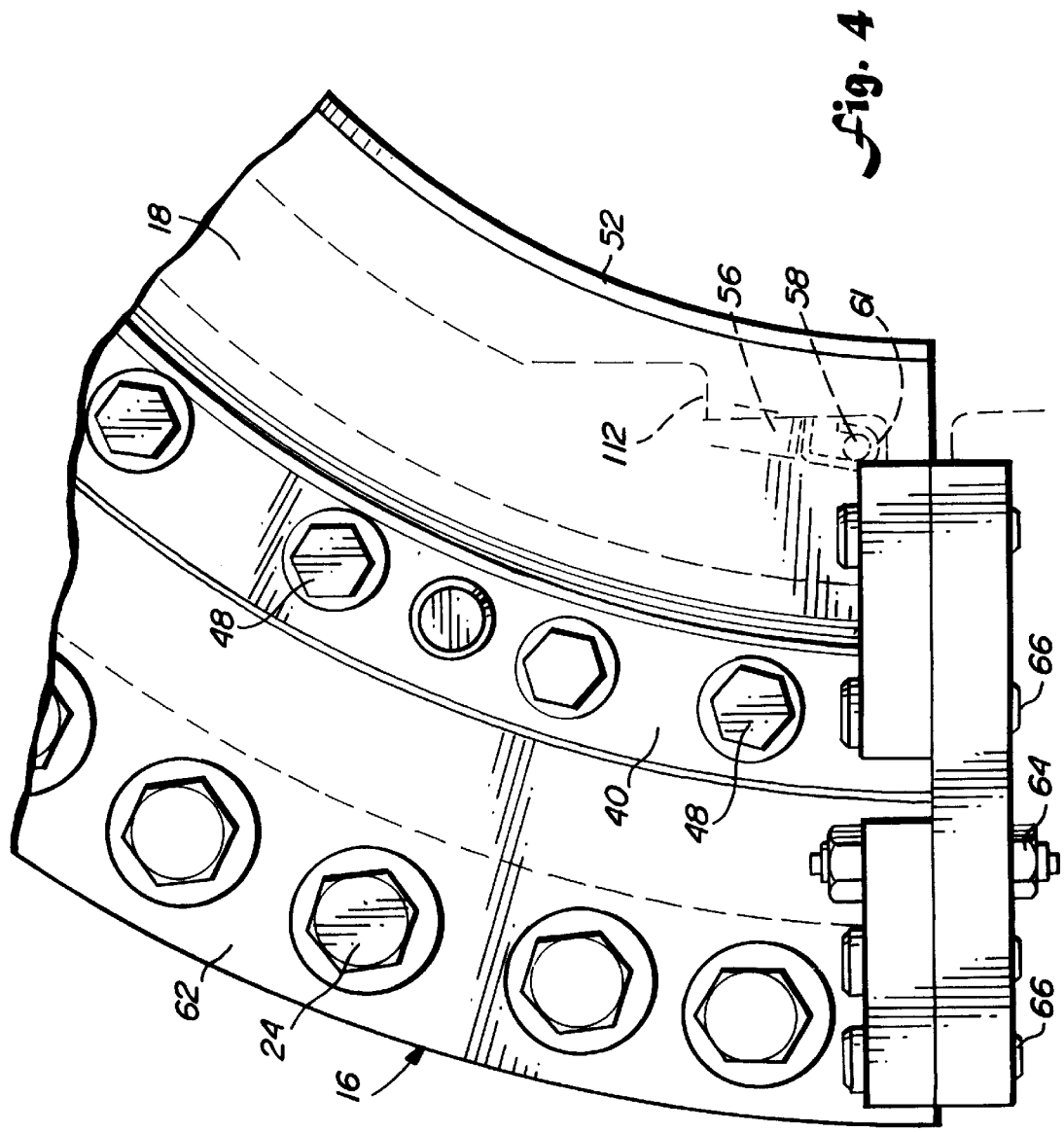
FIG. 4 is a partial end view of the upper seal casing half in accordance with the invention.

With reference now especially to FIGS. 1 and 4, the upper casing half 10A is of two-part construction, including a main body 16 and a cap 18. These two parts, when assembled, have a generally reverse h-shaped cross-section, forming a radially inwardly directed chamber or cell 20. More specifically, the main body 16 includes a radially outer flange portion provided with an array of bolt holes 22 by which the upper casing half is attached to the generator end shield 12, by means of bolts 24. Cylindrical insulation sleeves 26 surround the bolt shanks 28 (one shown in FIG. 1) where the bolt passes through the casing, and insulation ring 30 is also attached to the end face of the casing 10A between the casing 10A and the end shield 12 (but only at the collector end of the generator). This is a non-redundant insulation scheme, unlike redundant systems where extra parts are necessary to insulate the seal casing from the end shield. The insulation sleeves 26 and ring 30 may be conventional G-11 glass type, or the sleeves 26 may be provided in tubular form, shrunk fit onto the bolt shanks. The insulation could also comprise a glass/epoxy laminate.

The radially inner portion of the main body 16 is formed with an axially extending shoulder or step 32 located radially between a mounting surface 34 and a parallel inner wall portion 36.

The cap ring 18 is formed with an axial portion 38 connecting an upper radial flange portion 40 and a lower radial portion 42. The axial portion 38 thus defines a base for the chamber 20 while portions 42 and 36 form two, axially spaced, parallel sides of the chamber. Axially opposed shoulders 44, 46 define an opening facing the shaft 14.

The cap ring 18 is fastenable to the main body 16 by a semi-annular array of bolts 48 passing through holes 50 in the radial portion 40 of the cap and threadably received in the main body 16.

Figure 3:
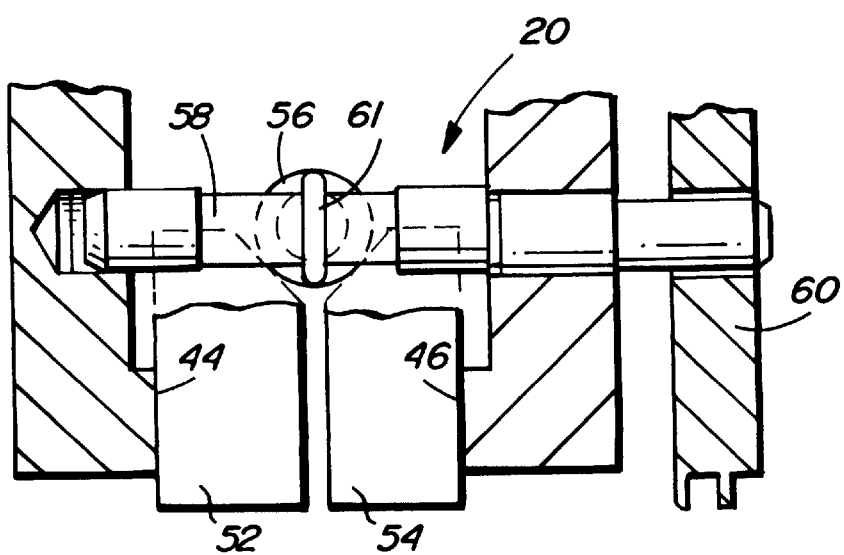
FIG. 3 is an enlarged detail taken from FIG. 3.

Within the chamber or cell 18, there are seated a pair of side-by-side seal segments 52, 54, each extending approximately 180° about the casing half. These seal segments are initially held in place by a coil spring 56 extending substantially 180° within the cell or chamber 18. The spring is seated within an area created by tapered surfaces 57, 59 on the respective segments. Opposite ends of the spring are anchored to axially extending pins 58 (one shown) via hook 61. Pin 58 is located within aligned bores in wall portions 42 and 36 of the casing segments, as best seen in FIG. 1. Pin 58 is also utilized to align and hold a labyrinth type oil seal 60. Prior to startup, spring 56 biases the seal segments in axially opposite directions, against opposed faces 44, 46 of the inner and outer segments 14, 16 within the cell or chamber opening, as best seen in the enlarged detail of FIG. 3. In use, the cell or chamber 18 is filled with oil which exerts both radial and axial pressure on the seal segments.

The upper casing half 10A is also shown to include a flange 62 extending radially along both the inner and outer segments, and provided with holes by which the upper casing half can be secured to the lower casing half along a similar mounting flange (not shown) on the lower casing half 10B, via bolts 64 and pins 66.

Figure 5:
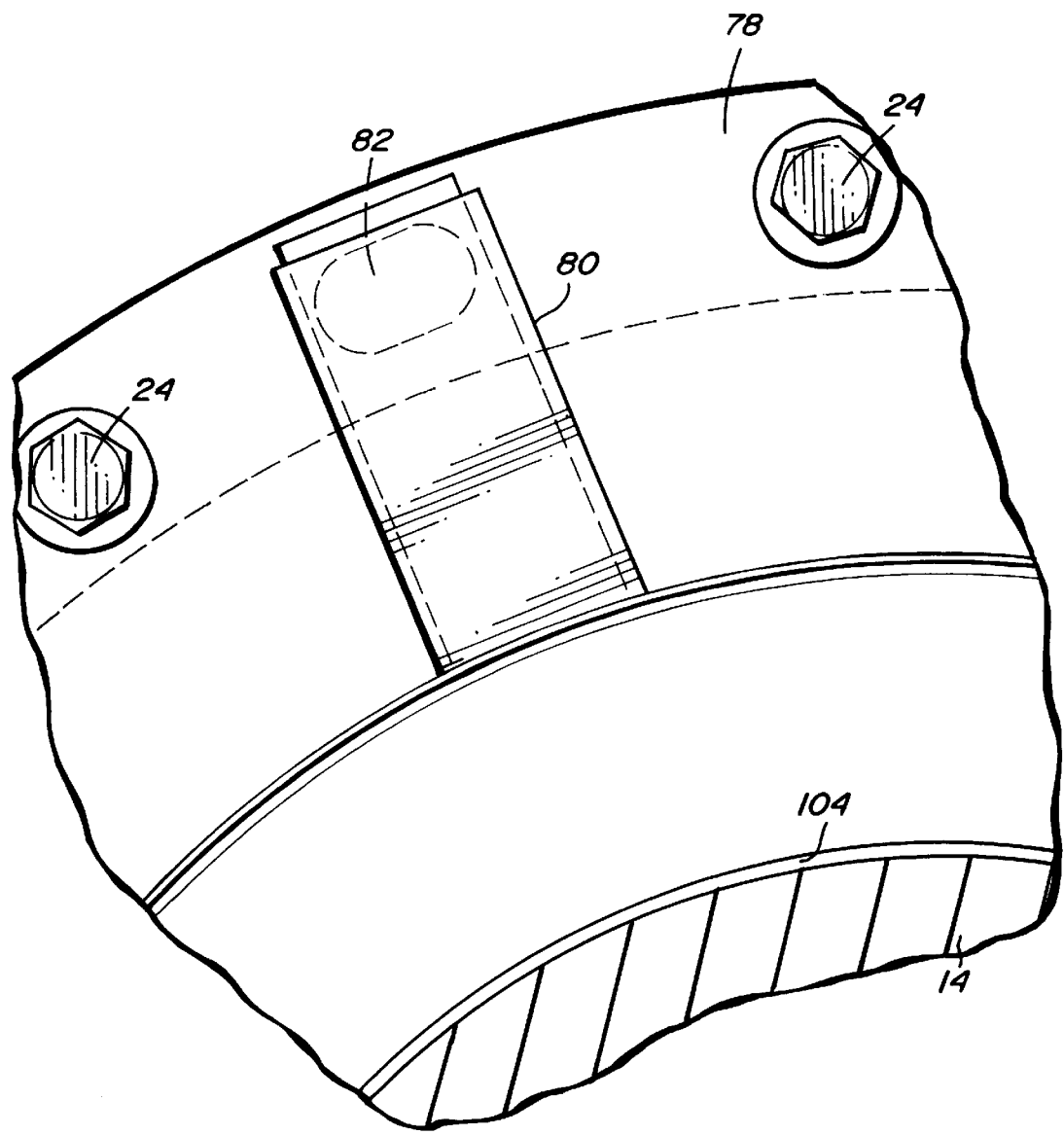
FIG. 5 is a partial end view of the lower seal casing half.

Turning now to the lower casing half 10B shown in FIG. 2, the most significant difference between the matched casing halves is that the lower casing half 10B is of one piece construction, but still of substantially reversed h-shape in section. Thus, the radially inner portion of the lower casing 10B includes a pair of axially spaced wall portions 66, 68 connected by an axial portion 70, thereby creating a cell or chamber 72 similar to cell 18, having a radially inwardly facing opening defined by opposed shoulders 74, 76. The radially outer portion of the lower casing half includes a radially outer flange portion 78, also provided with an array of bolt holes (not shown in FIG. 2 but shown in FIG. 5) similar to those at 22 in the upper casing for bolts 24 which secure the lower casing half 10B to the generator end shield. FIGS. 2 and 5 illustrate an oil housing 80 between bolt holes, permitting oil to be supplied through opening 82 in the casing (from the generator), flowing through the housing 80 and into the 360° cell 18, 72 formed when upper and lower casing halves 10A and 10B are joined. Two 180° seal segments 104, 106 are seated in the lower casing, with the assistance coil spring 108 and pins 110 (one shown) similar to those described above in connection with the upper casing. An improved assembly method will now be described.

The lower casing half 10B is initially appropriately located and bolted to the generator end shield 12 by means of bolts 24. The upper casing half 10A, absent the cap 18, is then appropriately located over the lower casing and also bolted to the end shield 12. The upper and lower casings are then bolted together using bolts 64 and alignment pins 66. The insulation 26, 30 on the bolt shanks and between the casing halves and the end shield, respectively, is then tested in accordance with standard procedures, generally applying a 500 volt ohmmeter which measures resistance across the insulation. It will be apparent that, with this invention, the upper and lower casing halves 10A, 10B can be appropriately located and bolted to the generator end shield for testing of the insulation parts before the seal segments 52, 54, 104, 106 are installed within the casing. After the insulation test procedures are successfully completed, the lower seal segments 104, 106 and spring 56 are slidably located within the lower casing half 10B from the opening provided by reason of the cap 18 not yet having been secured to the upper casing half 10A. The pins 110 can be inserted from outside the casing half (see FIG. 2) and held in place by snap rings or the like. The upper seal segments 52, 54 are then appropriately located within the upper casing half, and the upper and lower segments are then bolted together (see the bolt shoulder 112 in FIG. 4 through which a bore extends, and which is aligned with a similar bolt hole and bolt shoulder on the adjacent lower seal segment (not shown)). The pins 58 and spring 56 can be inserted into the casing or the cap after the upper and lower segments are bolted together. A similar arrangement is provided at the opposite seal segment interface. Finally, the cap 18 is bolted to the upper casing half 10A, via bolts 48.

The above design greatly simplifies the bolting of seal ring segments as this is done in the open and further reduces exposure to damage of the rings by eliminating relative motion between segments by allowing handling of the segments independently of other parts during assembly/disassembly.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A seal ring assembly for a generator comprising:
   an upper seal casing having a first radially inwardly directed channel, said upper seal casing having a removable of said inwardly directed channel;
   a lower seal casing having a second radially inwardly directed channel; and
   upper and lower seal segments adapted to be supported in said first radially inwardly directed channel and said second radially inwardly directed channel, respectively, of said upper and lower seal casings, such that, in use, said upper and lower seal casings and said upper and lower segments are adapted to be joined about a generator shaft to form a substantially 360° seal, with said upper and lower seal segments secured together at an interface therebetween.

2. The seal ring assembly of claim 1 in combination with a generator, wherein insulation is interposed between said upper and lower casings and said generator, and further wherein said upper and lower casings can be fixed to said generator and to each other prior to installation of said upper and lower seal segments and said cap said removable cap permitting installation of said upper and lower seal segments after said upper and lower casings are fixed to said generator and to each other.

3. The seal assembly of claim 2 wherein said upper and lower seal segments comprise a pair of side-by-side segments in each of said upper and lower seal casings, respectively.

4. The seal assembly of claim 3 wherein said upper and lower casings are attached to said generator by a plurality of bolts, and wherein said insulation includes sleeves on said bolts.

5. The seal assembly of claim 3 wherein when installed in said upper and lower seal casings, each of said pair of side-by-side seal segments is biased in opposite axial directions by a spring.

6. The seal assembly of claim 5 wherein each of said pair of side-by-side seal segments have adjacent tapered surfaces in which said spring is received.

7. The seal assembly of claim 5 wherein each spring is supported at opposite ends thereof by a respective pair of axially extending pins.

8. The seal ring assembly of claim 3 wherein said pairs of seal segments are joined by bolts accessible from said upper seal casing with said cap removed therefrom.

9. The seal ring assembly of claim 1 wherein said cap member includes a radially outer flange for engagement with a mounting surface on said upper casing, and a radially inner portion forming said one side of said inwardly directed channel, said radially outer flange and said radially inner portion connected by an axial portion forming a base of said inwardly directed channel.

10. The seal ring assembly of claim 1 including means for supplying oil to said first and second channels.

* * * * *